United States Patent
Yamane

(10) Patent No.: US 11,296,376 B2
(45) Date of Patent: Apr. 5, 2022

(54) SEALED BATTERY

(71) Applicant: Toyota Jidosha Kabushiki Kaisha, Toyota Aichi-ken (JP)

(72) Inventor: Shingo Yamane, Chiryu Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 316 days.

(21) Appl. No.: 16/298,163

(22) Filed: Mar. 11, 2019

(65) Prior Publication Data
US 2019/0280254 A1 Sep. 12, 2019

(30) Foreign Application Priority Data
Mar. 12, 2018 (JP) .............................. JP2018-044720

(51) Int. Cl.
| | |
|---|---|
| *H01M 50/116* | (2021.01) |
| *H01M 10/0587* | (2010.01) |
| *H01M 50/40* | (2021.01) |
| *H01M 50/474* | (2021.01) |
| *H01M 50/477* | (2021.01) |
| *H01M 50/584* | (2021.01) |
| *H01M 50/136* | (2021.01) |

(52) U.S. Cl.
CPC ..... *H01M 50/116* (2021.01); *H01M 10/0587* (2013.01); *H01M 50/136* (2021.01); *H01M 50/40* (2021.01); *H01M 50/474* (2021.01); *H01M 50/477* (2021.01); *H01M 50/584* (2021.01)

(58) Field of Classification Search
None
See application file for complete search history.

(56) References Cited

U.S. PATENT DOCUMENTS

| | | | |
|---|---|---|---|
| 2010/0203373 A1 | 8/2010 | Kawase et al. | |
| 2015/0340663 A1* | 11/2015 | Minagata | H01M 10/0413 429/163 |
| 2017/0047616 A1* | 2/2017 | Takahata | H01M 50/116 |
| 2017/0133718 A1* | 5/2017 | Suzuki | H01M 10/0525 |

FOREIGN PATENT DOCUMENTS

| | | |
|---|---|---|
| CN | 106684423 A | 5/2017 |
| JP | 2009-026704 A | 2/2009 |
| JP | 2017-091792 A | 5/2017 |

* cited by examiner

*Primary Examiner* — Jonathan Crepeau
(74) *Attorney, Agent, or Firm* — Dinsmore & Shohl LLP

(57) ABSTRACT

A sealed battery disclosed herein is provided with an electrode body, a battery case, and an insulating holder. Round sections, having a curved surface, are formed between an inner surface and a bottom surface of the battery case. Deformation portions protruding towards the center, in a width direction, are formed on the inner surface of a lower end section of the insulating holder. A lower end section of a positive electrode connection portion and a lower end section of a negative electrode connection portion are press-deformed towards the center, in the width direction, by the deformation portions of the insulating holder. It becomes accordingly possible to suitably prevent short-circuits between the electrode body and the battery case, even when clearances within the battery case are made small and a width dimension of the electrode body is made large. Energy density can be suitably increased as a result.

9 Claims, 12 Drawing Sheets

SEALED BATTERY

CROSS REFERENCE TO RELATED APPLICATIONS

The present application claims priority to Japanese Patent Application No. 2018-44720 filed on Mar. 12, 2018, the entire contents whereof are incorporated into the present specification by reference.

BACKGROUND

1. Technical Field

The present disclosure relates to a sealed battery. More particularly, the present disclosure relates to a sealed battery in which an electrode body and an electrolyte solution are accommodated inside a sealed battery case.

2. Description of the Related Art

Secondary batteries such as lithium ion secondary batteries and nickel-hydride batteries are lighter in weight and boast higher energy density that existing batteries, and accordingly have come to be used in recent years as so-called portable power sources for personal computers and mobile terminals, and as power sources for vehicle drive. In particular, lithium ion secondary batteries are expected to further gain in popularity in the future as high-output power sources for electric vehicles (EV), hybrid vehicles (HV), plug-in hybrid vehicles (PHV) and the like.

Secondary batteries of this kind are constructed in the form of so-called sealed batteries in which an electrode body and an electrolyte solution are accommodated in a sealed battery case.

FIG. 11 is a diagram illustrating schematically the internal structure of a conventional sealed battery. As illustrated in FIG. 11, an electrode body 110 is accommodated in the interior of a flat square-type battery case 150 of a sealed battery 100. Although not depicted in detail in the figure, the electrode body 110 is configured through winding of a sheet-shaped positive electrode and a sheet-shaped negative electrode, with separators sandwiched therebetween. The sheet-shaped positive electrode and negative electrode are both formed through coating of the surface of respective foil-shaped electrode collectors with respective electrode mix layers. A core portion 110a in which the electrode mix layer of the positive electrode (positive electrode mix layer) and an electrode mix layer of the negative electrode (negative electrode mix layer) oppose each other is formed at the central portion of the electrode body 110, in a width direction X.

Respective collector exposed portions in which the electrode mix layers are not applied are formed on one respective side edge section, in the width direction X, of the sheet-shaped positive electrode and of the sheet-shaped negative electrode described above. The portions at which the collector exposed portions are wound constitute a positive electrode connection portion 110b and a negative electrode connection portion 110c. A positive electrode terminal 170 is electrically connected to the positive electrode connection portion 110b and a negative electrode terminal 172 is electrically connected to the negative electrode connection portion 110c.

A metallic material such as aluminum can be used as the material of the battery case 150 of the sealed battery 100 having such a structure, with a view to curtailing weight while securing physical strength. In this case a box-shaped insulating holder 130 (specifically a resin-made box-shaped body) is used in order to prevent conduction between the battery case 150 and the electrode body 110. The battery case 150 and the electrode body 110 are isolated and insulated from each other through accommodation of the electrode body 110 in the interior of the insulating holder 130. Herein Patent Literature 1, JP 2009-026704 A, illustrates an example of a sealed battery provided with such an insulating holder.

SUMMARY

In the field of sealed batteries such as the one described above there is a demand for the development of technologies for further increasing energy density beyond conventional values, so as to more suitably bring performance out in the form of high-output power sources for vehicle drive.

In some embodiments, the energy density may be increased by increasing the coating surface areas of the positive electrode mix layer and of the negative electrode mix layer, to thereby widen of the core portion 110a, being the location of charging and discharge. However, a given or greater width of the positive electrode connection portion 110b and of the negative electrode connection portion 110c must be secured so as to enable proper connection with the positive electrode terminal 170 and the negative electrode terminal 172 in the electrode body 110 of the sealed battery 100, as illustrated in FIG. 11. Therefore, the technical approach of widening of the surface area of the core portion 110a through a decrease in the surface area of the positive electrode connection portion 110b or of the negative electrode connection portion 110c had thus limitations.

It is an object of the present disclosure, arrived at in the light of the above considerations, to provide art that allows making the surface area of a core portion of an electrode body larger than in conventional electrode bodies, and that allows suitably increasing the energy density of a sealed battery.

In order to attain the above goal, the present disclosure provides a sealed battery having the features below.

The sealed battery disclosed herein is provided with an electrode body resulting from winding or stacking of a sheet-shaped positive electrode and a sheet-shaped negative electrode, a flat square-type battery case in which the electrode body and an electrolyte solution are accommodated, and a box-shaped insulating holder that accommodates the electrode body and insulates the electrode body and the battery case from each other.

The positive electrode is provided with a foil-shaped positive electrode collector and a positive electrode mix layer coated onto the surface of the positive electrode collector, and the negative electrode is provided with a foil-shaped negative electrode collector and a negative electrode mix layer coated onto surface of the negative electrode collector. In the electrode body, a core portion at which the positive electrode mix layer and the negative electrode mix layer oppose each other is formed at a central portion in the width direction, and a positive electrode connection portion resulting from winding or stacking of the positive electrode collector not coated with the positive electrode mix layer is formed at a first side edge section in the width direction, and a negative electrode connection portion resulting from winding or stacking of the negative electrode collector not coated with the negative electrode mix layer is formed at a second side edge section in the width direction. A round section of curved surface is formed between an inner surface and a bottom surface of the battery case, and an inner dimension, in the width direction, of a region at which the round section is formed is smaller than the inner dimension, in the width direction, of a portion of another region of the battery case.

In the sealed battery disclosed herein, a deformation portion protruding towards the center in the width direction is formed on at least one inner surface of a lower end section of the insulating holder; and at least one from among a lower end section of the positive electrode connection portion and a lower end section of the negative electrode connection portion is press-deformed towards the center in the width direction by the deformation portion of the insulating holder.

The inventors conducted diligent research with a view to solving the above problems. As a result, the inventors surmised that the energy density of a sealed battery can be increased if the space (clearance) that is present inside the battery case of the sealed battery could be reduced, and the dimensions of the electrode body could be increased in proportion.

Specifically, a clearance S1 between the inner surface 150a of the battery case 150 and the outer surface 130b of the insulating holder 130, and a clearance S2 between the inner surface 130a of the insulating holder 130 and the electrode body 110 are present in the interior of the battery case 150 of the sealed battery 100 such as the one illustrated in FIG. 11. The inventors speculated that if the clearances S1, S2 could be made smaller then it would be possible to utilize an electrode body of width dimension larger than in conventional electrode bodies, which in turn would allow increasing the surface area of the core portion 110a and suitably increasing energy density, without a reduction in the surface area of the positive electrode connection portion 110b or of the negative electrode connection portion 110c.

However, the above-described clearances S1, S2 are provided in order to prevent short-circuits derived from contact between the electrode body 110 and the battery case 150. Accordingly, increasing the width dimension of the electrode body 110 by making the clearances S1, S2 smaller entails a higher risk of occurrence of short-circuits between the electrode body 110 and the battery case 150.

Specifically, a round section 150c is formed between the inner surface 150a and the bottom surface 150b of the square-type battery case 150, in order to curtail the weight of the ordinary sealed battery 100 while securing physical strength. When the insulating holder 130 is accommodated in the interior of the battery case 150, a lower end section 130c of the insulating holder 130 may come into contact (interfere) with the round section 150c of the battery case 150.

In the sealed battery 100 having such a structure the frequency of contact between the lower end section 130c of the insulating holder 130 and the round section 150c of the battery case 150 increases when the width dimension of the insulating holder 130 is made large and the clearance S1 between the inner surface 150a of the battery case 150 and the outer surface 130b of the insulating holder 130 is made small. In that case there is a higher likelihood of occurrence of damage, for instance in that the inner and outer sides of the insulating holder 130 communicate with the lower end section 130c of the insulating holder 130.

In a case where on the other hand the width dimension of the electrode body 110 is made large and the clearance S2 between the inner surface 130a of the insulating holder 130 and the electrode body 110 is made small, the lower end section of the positive electrode connection portion 110b (negative electrode connection portion 110c) of the electrode body 110 becomes exposed outside the insulating holder 130 when the insulating holder 130 is damaged, as described above. The likelihood of contact with the round section 150c of the battery case 150 is higher in such a case.

Taking into consideration the above-described technical constraints, the inventors speculated that if a scheme could be developed that allows properly preventing short-circuits between the electrode body and the battery case, even when clearances in the interior of the battery case are made small, energy density could nevertheless be suitably increased by virtue of the fact that the width dimension of the electrode body could be made larger in such a case.

In the sealed battery disclosed herein, arrived at on the basis of the above finding, a deformation portion protruding towards the center in the width direction is formed on one inner surface of a lower end section of an insulating holder. As a result there can be secured sufficient thickness of the lower end section of the insulating holder, and accordingly it becomes possible to prevent damage to the lower end section of the insulating holder derived from contact between the battery case and the round section. In consequence the clearance between the insulating holder and the inner surface of the battery case can be made smaller, and the width dimension of the insulating holder and of the electrode body can be made larger in proportion.

In the sealed battery disclosed herein, a lower end section of the positive electrode connection portion (and/or negative electrode connection portion) is press-deformed towards the center, in the width direction, by the deformation portion of the insulating holder. In consequence, the lower end section of the positive electrode connection portion (and/or negative electrode connection portion) of the electrode body can be prevented from being exposed outside the insulating holder, even when the lower end section of the insulating holder is damaged through contact with the round section of the battery case. Accordingly, the clearance between the inner surface of the insulating holder and the electrode body can be made smaller, and the width dimension of the electrode body can be made larger in proportion.

Thus, the sealed battery disclosed herein allows properly preventing short-circuits between the electrode body and the battery case even when clearances within the battery case are made small. As a result there can be used an electrode body having a larger width dimension than conventional electrode bodies, and energy density can be increased suitably.

In some embodiments of the sealed battery disclosed herein, the deformation portion is formed on both sides of the inner surface of the lower end section of the insulating holder.

In the sealed battery disclosed herein, the deformation portion may be formed at any of the inner surfaces of the lower end section of the insulating holder. Also, the deformation portion may be formed on both sides of the inner surface of the lower end section of the insulating holder, as in the present implementation, since in that case short-circuits between the battery case and the electrode body can be prevented more reliably.

In some embodiments of the sealed battery disclosed herein, the insulating holder is formed through folding of a film made of an insulating resin; and the deformation portion is formed through multiple folding of the film.

As a result, it becomes possible to form deformation portions having sufficient thickness comparatively easily, and in consequence to suitably suppress drops in production efficiency incurred by forming deformation portions anew.

In some embodiments of the sealed battery disclosed herein, a dimension of the electrode body in the width direction is substantially identical to an inner dimension, in the width direction, of an upper end section of the insulating holder.

The clearance between the electrode body and the inner surface of the insulating holder can be made sufficiently small by using thus an electrode body of size substantially identical to the inner dimension of the insulating holder in the width direction. As a result the energy density of the sealed battery can be enhanced yet more suitably.

In the sealed battery disclosed herein, the lower end section of the positive electrode connection portion (and/or negative electrode connection portion) of the electrode body is press-deformed inward in the width direction. Accordingly, the electrode body can be reliably prevented from being exposed outside the insulating holder when the insulating holder is damaged, even if the clearance between the inner surface of the insulating holder and the electrode body is eliminated. In this case a dimension difference between the dimension of the electrode body in the width direction and the inner dimension of the insulating holder in the inner dimension may be 0.05 mm or smaller. As a result the energy density of the sealed battery can be enhanced yet more suitably.

In some embodiments of the sealed battery disclosed herein, the thickness of the deformation portion in the width direction is 0.1 mm to 1.0 mm.

When the thickness of the deformation portion of the insulating holder in the width direction is excessively large, a concern arises of press-deformation occurring not only in the positive electrode connection portion (and/or negative electrode connection portion) of the electrode body but also in the core portion, and battery performance may drop. If on the other hand the thickness of the deformation portion in the width direction is excessively small, it may be difficult to press-deform properly the positive electrode connection portion (and/or negative electrode connection portion). Given these considerations, the thickness of the deformation portion in the width direction may be set to lie within the above-described numerical value range.

In some embodiments of the sealed battery disclosed herein, a proportion of the dimension of the core portion in the width direction with respect to the dimension of the electrode body in the width direction is in the range of 0.7 to 0.9.

As described above, in the sealed battery disclosed herein there can be used an electrode body the width dimension of which is larger than in conventional electrode bodies. By using an electrode body of large width dimension it becomes possible to increase the width dimension of the core portion while sufficiently maintaining the width dimension of the positive electrode connection portion (negative electrode connection portion) so as to allow the positive electrode terminal (negative electrode terminal) to be properly connected. The sealed battery disclosed herein allows using an electrode body having a core portion the surface area of which is larger than in conventional electrode bodies, namely in that the proportion of the dimension of the core portion in the width direction is in the range of 0.7 to 0.9, and accordingly energy density can be suitably increased.

DETAILED DESCRIPTION

Figure 1:
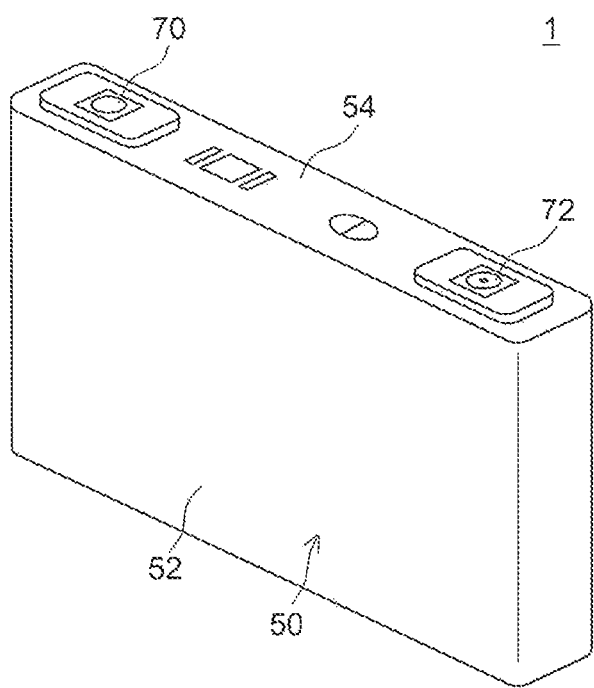
FIG. 1 is a perspective-view diagram illustrating schematically the outer shape of a sealed battery according to an embodiment of the present disclosure.

Embodiments of the present disclosure will be explained next with reference to accompanying drawings. Any features other than the matter specifically set forth in the present disclosure and that may be necessary for carrying out the present disclosure can be regarded as instances of design matter for a person skilled in the art based on known art in the relevant field. The disclosure can be realized on the basis of the disclosure of the present specification and common technical knowledge in the relevant field. In the explanation of the drawings below, members and portions that elicit identical effects are denoted with identical reference numerals, and a redundant explanation thereof will be omitted or simplified. The dimensional relationships (length, width, thickness and so forth) in the figures do not reflect actual dimensional relationships.

An example of a lithium ion secondary battery will be explained below as an embodiment of the sealed battery of the present disclosure. In the present specification, the term "lithium ion secondary battery" denotes a secondary battery that utilizes lithium ions as charge carriers, and that is charged and discharged as a result of the movement of lithium ions across a positive electrode and a negative electrode. The explanation below is not meant to limit the object of the present disclosure to lithium ion secondary batteries. Other examples of application of the present disclosure include for instance nickel-hydride batteries.

1. Sealed Battery According to Present Embodiment

Figure 2:
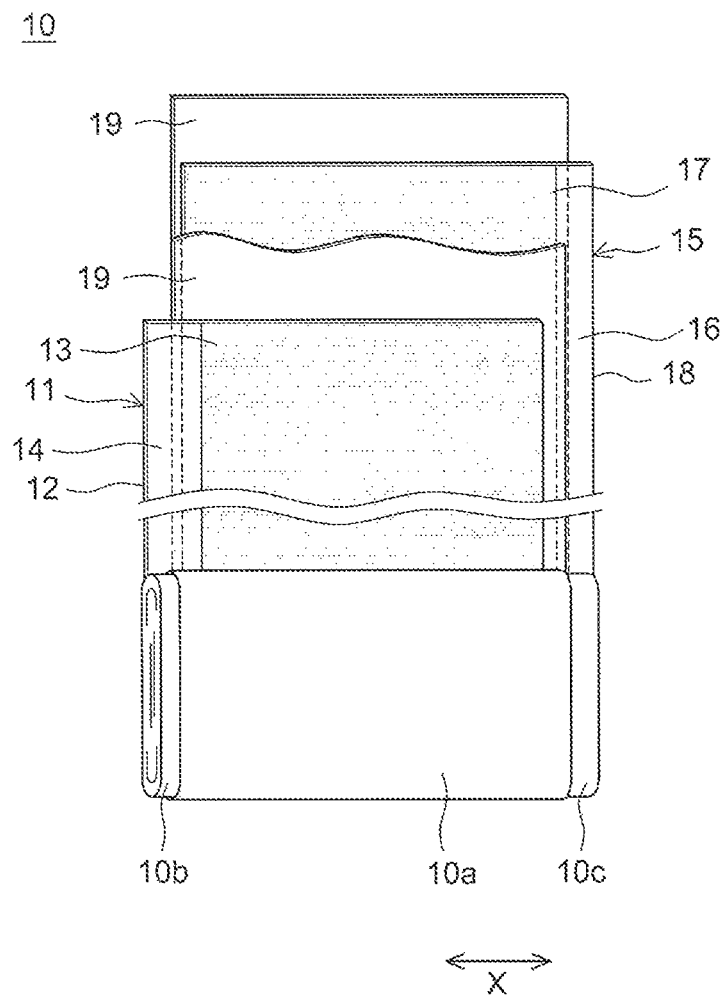
FIG. 2 is a perspective-view diagram illustrating schematically an electrode body of a sealed battery according to an embodiment of the present disclosure.
Figure 3:
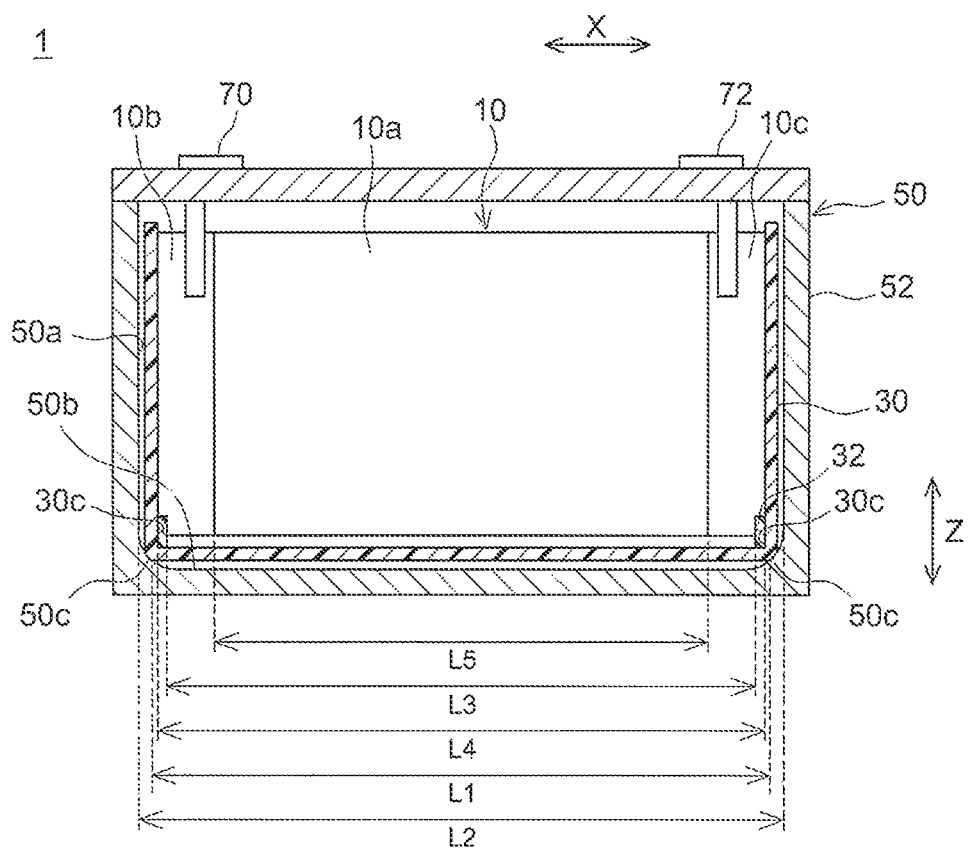
FIG. 3 is a diagram illustrating schematically the internal structure of a sealed battery according to an embodiment of the present disclosure.
Figure 4:
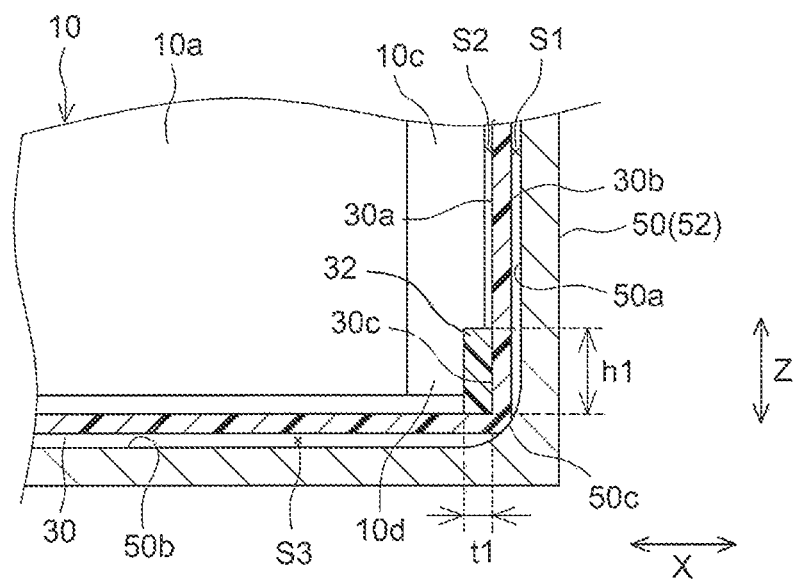
FIG. 4 is an enlarged-view diagram of the vicinity of a lower end section of a negative electrode connection portion of the sealed battery illustrated in FIG. 3.

FIG. 1 is a perspective-view diagram illustrating schematically a sealed battery according to the present embodiment. FIG. 2 is a perspective-view diagram illustrating schematically an electrode body of the sealed battery. FIG. 3 is a side-view diagram illustrating schematically the internal structure of a sealed battery according to the present embodiment. FIG. 4 is an enlarged-view diagram of the vicinity of a lower end section of a negative electrode connection portion of the sealed battery illustrated in FIG. 3. The reference symbol X in the figures of the present specification denotes a width direction of the sealed battery, the reference symbol Y denotes a thickness direction, and the reference symbol Z denotes a height direction.

(1) Battery Case

As illustrated in FIG. 1, a sealed battery 1 according to the present embodiment is provided with a flat square-type battery case 50. An electrode body and an electrolyte solution are accommodated in the interior of the battery case 50. The battery case 50 in the present embodiment is made up of a metal-made material such as aluminum, stainless steel or nickel-plated steel.

The battery case 50 is provided with a case body 52 and a lid body 54. The case body 52 is a flat box-like container having an opening at the top face. The lid body 54 is a plate-like member that plugs the opening at the top face of the case body 52. A positive electrode terminal 70 and a negative electrode terminal 72 are provided in the lid body 54 that constitutes the top face of the battery case 50. As will be described in detail further on, the positive electrode terminal 70 and the negative electrode terminal 72 are electrically connected to the electrode body inside the battery case 50.

As illustrated in FIG. 3 and FIG. 4, in the present embodiment, round sections 50c are formed in the interior of the battery case 50. The round sections 50c, having a curved surface, are formed between an inner surface 50a and a bottom surface 50b of the battery case 50. The physical strength of the battery case 50 can be enhanced through formation of such round sections 50c.

The battery case 50 is formed in such a manner that an inner dimension of the region at which the round sections 50c is formed, in the width direction X, is smaller than the inner dimension of a portion of other regions of the battery case 50, in the width direction X. In other words, in the battery case 50, an inner dimension L1, in the width direction X, of a lower end section of the battery case 50 at which the round sections 50c are formed is smaller than an inner dimension L2, in the width direction X, of the upper end section of the battery case 50.

The insulating holder 30 and the round sections 50c interfere with each other when the radius of curvature of the round sections 50c is set to be excessively large, and as a result it may become difficult to reduce a below-described clearance S1 between the inner surface 50a of the battery case 50 and the outer surface 30b of the insulating holder 30. On the other hand, the physical strength of the battery case 50 may drop when the radius of curvature of the round sections 50c is excessively small. The radius of curvature of the round sections 50c of the insulating holder 30 may be adjusted as appropriate with the foregoing considerations in mind.

(2) Electrode Body

As illustrated in FIG. 3 and FIG. 4, in the sealed battery 1 according to the present embodiment an electrode body 10 is accommodated in the interior of the battery case 50. As illustrated in FIG. 2, the electrode body 10 is a wound electrode body formed through winding of a sheet-shaped positive electrode 11 and a sheet-shaped negative electrode 15. Specifically, the electrode body 10 of the present embodiment is formed through laying of the positive electrode 11 and the negative electrode 15 with two separators 19 (sheet-shaped insulating member) interposed therebetween, followed by winding of the resulting stack, in the longitudinal direction.

The above-described positive electrode 11 is formed through application of a positive electrode mix layer 13 onto the surface of a foil-shaped positive electrode collector 12. The positive electrode mix layer 13 contains a metal oxide (positive electrode active material) capable of reversibly storing and releasing charge carriers. On one respective side edge section of the positive electrode 11 in the width direction, there is formed a positive electrode collector exposed portion 14 not coated with the positive electrode mix layer 13.

Meanwhile, the negative electrode 15 as well is formed through application of a negative electrode mix layer 17 onto the surface of a foil-shaped negative electrode collector 16, similarly to that of the positive electrode 11 described above. A carbon material capable of reversibly storing and releasing charge carriers is used as a negative electrode active material contained in the negative electrode mix layer 17. A negative electrode collector exposed portion 18 at which the negative electrode mix layer 17 is not applied is provided on one respective side edge section of the negative electrode 15 in the width direction.

Materials identical to those used in ordinary lithium ion secondary batteries can be used, without particular limitations, as the materials of the positive electrode 11, the negative electrode 15 and the separators 19; such materials are not characterizing features of the present disclosure, and hence a detailed explanation thereof will be omitted herein.

A core portion 10a in which the positive electrode mix layer 13 and the negative electrode mix layer 17 are wound opposing each other is formed at a central portion, in the width direction X, of the electrode body 10 that results from winding the positive electrode 11 and the negative electrode 15. At the core portion 10a charging and discharge take place as a result of the movement of charge carriers (lithium ions) between the positive electrode mix layer 13 and the negative electrode mix layer 17.

A positive electrode connection portion 10b resulting from winding of the positive electrode collector exposed portion 14 is formed at a first side edge section of the electrode body 10 in the width direction X. A negative electrode connection portion 10c resulting from winding of the negative electrode collector exposed portion 18 is formed at a second side edge section. In the sealed battery 1, as illustrated in FIG. 3, a positive electrode terminal 70 is connected to the positive electrode connection portion 10b of the electrode body 10 and a negative electrode terminal 72 is connected to the negative electrode connection portion 10c.

(3) Electrolyte Solution

Although omitted in the figures, in the sealed battery 1 an electrolyte solution is accommodated in the interior of the battery case 50 together with the electrode body 10 described above. The electrolyte solution is not particularly limited, and for instance an electrolyte solution containing a supporting salt, at a predetermined concentration, in a mixed solvent of ethylene carbonate (EC), dimethyl carbonate (DMC) and ethyl methyl carbonate (EMC) can be used herein as the electrolyte solution. As the supporting salt there can be used for instance a fluorine-containing lithium compound, for instance $LiPF_6$, $LiBF_4$ or $LiCF_3SO_3$.

(4) Insulating Holder

In the sealed battery 1 according to the present embodiment the insulating holder 30 is used for the purpose of preventing conduction between the metal-made battery case 50 and the electrode body 10. The insulating holder 30 is a box-shaped insulating member having an opening at the top face, and can be shaped for instance through folding of a film made of an insulating resin. The electrode body 10 being a power generation element and the metal-made battery case 50 can be isolated and insulated from each other by accommodating the electrode body 10 in the interior of the box-shaped insulating holder 30. The insulating holder 30 is not particularly limited, so long as it is made up of a material that can function as an insulating member. The insulating holder 30 may be made up of a resin material such as polypropylene (PP) or polyethylene (PE), for instance with material cost and ease of shaping in mind.

In the present embodiment a pair of deformation portions 32 protruding towards the center, in the width direction X, is formed on either side of the inner surface of the lower end section 30c of the insulating holder 30. The deformation portions 32 can be formed through multiple folding of an insulating resin-made film when the insulating holder 30 is formed through folding of the insulating resin-made film. An example will be explained below of a procedure for shaping the insulating holder 30 provided with the deformation portions 32.

Figure 5:
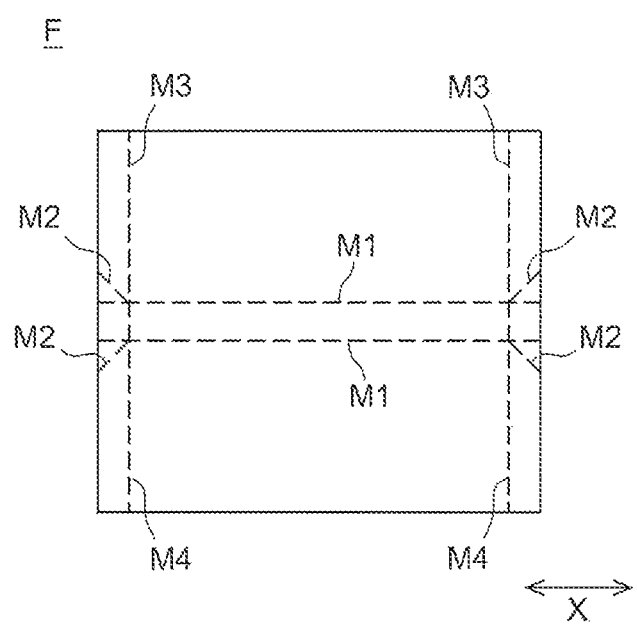
FIG. 5 is a plan-view diagram illustrating a film used for shaping an insulating holder of a sealed battery according to an embodiment of the present disclosure.
Figure 6A:
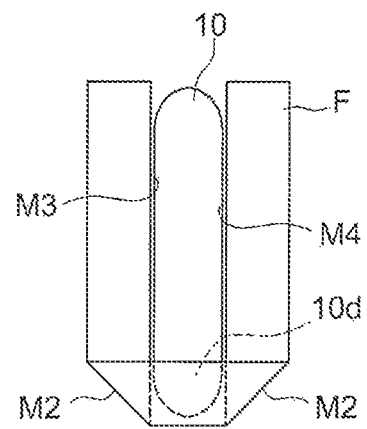
FIG. 6A is a side-view diagram for explaining shaping of an insulating holder of a sealed battery according to an embodiment of the present disclosure.
Figure 6B:
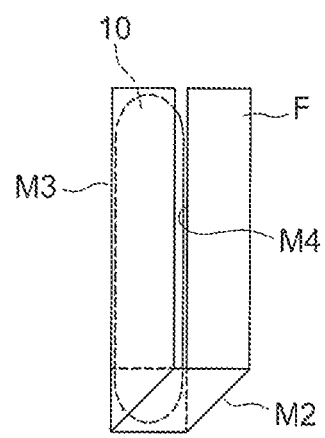
FIG. 6B is a side-view diagram for explaining shaping of an insulating holder of a sealed battery according to an embodiment of the present disclosure.
Figure 6C:
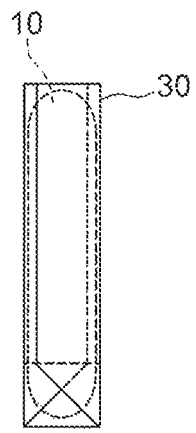
FIG. 6C is a side-view diagram for explaining shaping of an insulating holder of a sealed battery according to an embodiment of the present disclosure.

FIG. 5 is a diagram illustrating a film used for shaping an insulating holder of a sealed battery according to the present embodiment. FIG. 6A to FIG. 6C are side-view diagrams for explaining shaping of an insulating holder of a sealed battery according to the present embodiment.

Firstly, a film F illustrated in FIG. 5 is folded at portions of rule lines M1, to be formed to a U-shape in a side view. The electrode body 10 is then disposed in the inward side of the U-shaped film F, as illustrated in FIG. 6A, and thereafter a part of both side edges of the film F are folded inward through folding of portions of rule lines M2 illustrated in FIG. 5, in such a manner that a respective lower end section 10d of the positive electrode connection portion (negative electrode connection portion) of the electrode body 10 and the film F are in contact with each other. Next, both side edges of the film F are folded inward through folding of portions of rule lines M3 and rule lines M4, as illustrated in FIG. 6B and FIG. 6C, in such a manner that the side faces of the electrode body 10 are covered by the film F. The insulating holder 30 of the present embodiment becomes shaped as a result. Herein the film is folded over to a greater extent at the lower end section 30c of the insulating holder 30 than at other portions, and thus deformation portions 32 such as the those illustrated in FIG. 3 become formed at the inner surface.

In the present embodiment, as illustrated in FIG. 3, the pair of deformation portions 32 having a predetermined thickness t1 (see FIG. 4) are formed at the inner surface of the lower end section 30c of the insulating holder 30. Accordingly, an inner dimension L3 of the lower end section 30c of the insulating holder 30 in the width direction X is smaller than an inner dimension L4 of the upper end section of the insulating holder 30 in the width direction X. When the electrode body 10 is accommodated in the interior of such an insulating holder 30, the lower end section 10d of the negative electrode connection portion 10c of the electrode body 10 becomes pressed by a respective deformation portion 32, and is deformed towards the center in the width direction X, as illustrated in FIG. 4. Although not illustrated in detail, the lower end section of the positive electrode connection portion 10b undergoes similarly press-deformation towards the center, in the width direction X, by a respective deformation portion 32 of the insulating holder 30.

Press-deformation of the electrode body 10 can occur for instance during rightward folding of both side edges of the film F so as to cover the side faces of the electrode body 10 (see FIG. 6B and FIG. 6C), in the shaping of the above-described insulating holder 30, or during interference of the lower end section 30c of the insulating holder 30, accommodated in the battery case 50, with the round sections 50c of the battery case 50.

In the sealed battery 1 according to the present embodiment there is used the insulating holder 30 having the above-described structure, and accordingly short-circuits between the electrode body 10 and the battery case 50 can be prevented properly even when the clearances S1, S2 provided in order to prevent short-circuits between the electrode body 10 and the battery case 50 are made smaller. In the present embodiment, therefore, the clearances S1, S2 in the battery case 50 can be made sufficiently small, and the dimension of the electrode body 10 larger in proportion, and therefore energy density can be suitably increased. A concrete explanation follows next.

In the sealed battery 1 according to the present embodiment, firstly, the deformation portions 32 of a predetermined thickness t1 are formed on the inner surface of the lower end section 30c of the insulating holder 30, and accordingly there can be secured sufficient thickness of the lower end section 30c of the insulating holder 30. Therefore, the occurrence of damage such as communication between the interior and the exterior of the insulating holder 30 can be suitably suppressed even when the dimension of the insulating holder 30 in the width direction X is set to be large and the clearance S1 between the inner surface 50a of the battery case 50 and the outer surface 30b of the insulating holder 30 is set small so that the insulating holder 30 and the round sections 50c in the battery case 50 come into contact with each other (interfere with each other).

In the present embodiment, next, the lower end sections of the positive electrode connection portion 10b and of the negative electrode connection portion 10c of the electrode body 10 are press-deformed towards the center, in the width direction X, by the deformation portions 32 of the insulating holder 30. In the present embodiment, the lower end sections of the positive electrode connection portion 10b and of the negative electrode connection portion 10c of the electrode body 10 are thus press-deformed so as to be spaced off the lower end section 30c of the insulating holder 30. As a result, the positive electrode connection portion 10b and the negative electrode connection portion 10c of the electrode body 10 can be suitably prevented from being exposed outside the insulating holder 30, even when the lower end section 30c of the insulating holder 30 is damaged. Accordingly, contact between the electrode body 10 and the round sections 50c of the battery case 50 can be suitably prevented. The clearance S2 between the electrode body 10 and the inner surface 30a of the insulating holder 30, provided in order to prevent exposure outside the insulating holder 30, can be made smaller as a result.

The sealed battery 1 according to the present embodiment allows reducing the clearances S1, S2 provided in order to prevent short-circuiting of the electrode body 10 and the battery case 50, and allows increasing, in proportion, the dimension in the electrode body 10 in the width direction X. As a result, the surface area of the core portion 10a of the electrode body 10 (coating surface areas of the positive electrode mix layer and of the negative electrode mix layer) can be increased, and energy density can be suitably increased with respect to that of a conventional sealed battery.

(5) Dimensions of Various Members

The sealed battery 1 according to the present embodiment allows reducing the size of the clearances S1, S2 inside the battery case 50 and, in proportion thereto, increasing the dimension of the electrode body 10, as described above. In the sealed battery 1 according to the present embodiment, therefore, the dimensions of the various members in the interior of the battery case 50 differ from those of conventional sealed batteries. An example of dimensional relationships in the sealed battery 1 will be explained next. The dimensions explained below are not meant to limit the present disclosure in any way, and can be modified as appropriate for instance depending on the size of the sealed battery.

(a) Dimensions of Deformation Portions

The dimensions of the deformation portions 32 of the insulating holder 30 are not particularly limited, so long as the positive electrode connection portion 10b (negative electrode connection portion 10c) of the electrode body 10 can be press-deformed inwards in the width direction X. If the thickness t1 (FIG. 4) of the deformation portions 32 in the width direction X is excessively large, however, a concern arises that press-deformation may affect not only the positive electrode connection portion 10b and the negative electrode connection portion 10c, but may also reach up to the core portion 10a. If the thickness t1 of the deformation portions 32 is excessively small, it may be difficult to press-deform properly the positive electrode connection portion 10b and the negative electrode connection portion 10c. Given the above, the thickness t1 of the deformation portions 32 in the width direction X may be in the range of 0.1 mm to 1.0 mm (and is for instance 0.5 mm).

In a case where the height h1 of the deformation portions 32 is excessively large or excessively small, it becomes difficult to properly press and deform the lower end sections of the positive electrode connection portion 10b and the negative electrode connection portion 10c of the electrode body 10. With the above in mind, the height h1 of the deformation portions 32 may be set to lie in the range of 5 mm to 20 mm (and for instance to 10 mm).

(b) Dimensions of Electrode Body and Insulating Holder in Width Direction

The dimension of the electrode body 10 in the width direction X may be substantially identical to the inner dimension L4 of the upper end section of the insulating holder 30 in the width direction X. More specifically, a dimension difference between the dimension of the electrode body 10 in the width direction X and the inner dimension L4 of the upper end section of the insulating holder 30 in the width direction X may be set to 0.05 mm or smaller. As a result the clearance S2 between the inner surface 30a of the insulating holder 30 and the electrode body 10 can be kept properly small, and accordingly the width dimension of the electrode body 10 can be made sufficiently large, and energy density can be suitably increased.

In the sealed battery 1 according to the present embodiment, the dimension of the electrode body 10 in the width direction and the inner dimension L4 of the upper end section of the insulating holder 30 in the width direction X may be set to lie in the range of 100 mm to 150 mm, and are for instance set to 135 mm.

(c) Dimensions of Insulating Holder and of Battery Case in Width Direction

In the present embodiment, as described above, the outer dimension of the insulating holder 30 in the width direction X can be made larger, and the clearance S1 between the inner surface 50a of the battery case 50 and the outer surface 30b of the insulating holder 30 can be made smaller. If the outer dimension of the insulating holder 30 in the width direction is made excessively large, however, a clearance S3 (see FIG. 4) below the insulating holder 30 may become larger on account of interference between the insulating holder 30 and the round sections 50c of the battery case 50. The outer dimension of the insulating holder 30 in the width direction may be adjusted as appropriate with the above in mind.

(d) Dimensions of Core Portion

As described above, the sealed battery 1 according to the present embodiment allows reducing the size of the clearances S1, S2 inside the battery case, and increasing thereby the dimension of the electrode body 10 in the width direction X. It suffices that the positive electrode connection portion 10b (negative electrode connection portion 10c) have dimensions similar to those of conventional electrode bodies (dimension such that the positive electrode terminal 70 (negative electrode terminal 72) can be connected), as a result of which the dimension of the core portion 10a in the width direction can be increased in proportion. In consequence, the proportion of the core portion 10a with respect to the entirety of the electrode body 10 that is used in the present embodiment can be made larger than in conventional cases. In the sealed battery 1 according to the present embodiment, specifically, for instance the proportion of the dimension of the core portion in the width direction with respect to a dimension L5 of the electrode body 10 in the width direction X is set to lie in the range of 0.7 to 0.9. The dimension L5 of the electrode body 10 in the width direction X may be smaller than the inner dimension L3 of the lower end section 30c of the insulating holder 30 in the width direction X, from the viewpoint of preventing deformation of the core portion 10a of the electrode body 10.

2. Other Embodiments

A sealed battery according to an embodiment of the present disclosure has been explained above. However, the sealed battery disclosed herein is not limited to the above-described embodiment, and may accommodate various suitable modifications, as appropriate.

(1) Shaping of Insulating Holder

In the above-described embodiment, for instance the film F illustrated in FIG. 5 made of an insulating resin is folded in the manner illustrated in FIG. 6A to FIG. 6C, to thereby shape the insulating holder 30. The method for shaping the insulating holder, however, is not limited to that in the above-described embodiment.

Figure 7:
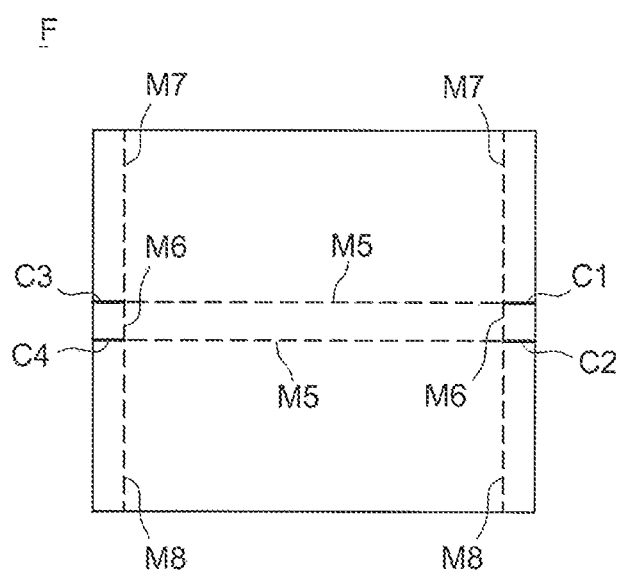
FIG. 7 is a plan-view diagram illustrating a film used for shaping an insulating holder of a sealed battery according to another embodiment of the present disclosure.
Figure 8A:
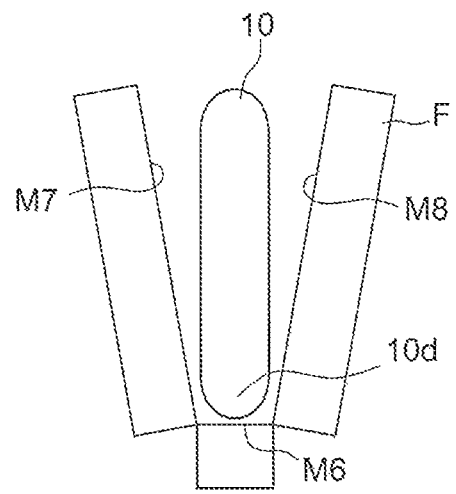
FIG. 8A is a side-view diagram for explaining shaping of an insulating holder of a sealed battery according to another embodiment of the present disclosure.
Figure 8B:
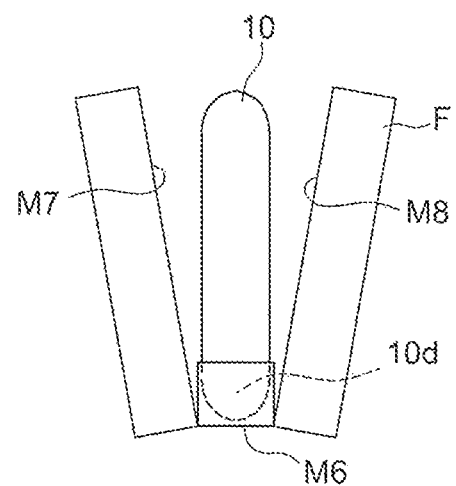
FIG. 8B is a side-view diagram for explaining shaping of an insulating holder of a sealed battery according to another embodiment of the present disclosure.
Figure 8C:
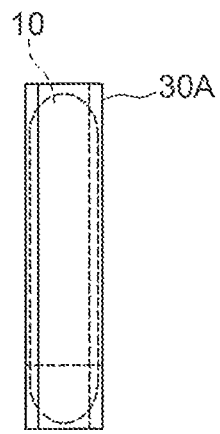
FIG. 8C is a side-view diagram for explaining shaping of an insulating holder of a sealed battery according to another embodiment of the present disclosure.

FIG. 7 is a plan-view diagram illustrating a film used for shaping an insulating holder of a sealed battery according to another embodiment of the present disclosure. FIG. 8A to FIG. 8C are side-view diagrams for explaining shaping of the insulating holder.

The method illustrated in the figures involves cutting the film F along score lines C1 to C4, prior to shaping of the insulating holder through folding of the film F illustrated in FIG. 7. The film F is folded at the portions of the rule lines M5, to thereby be formed to a U-shape in a side view. The electrode body 10 is then disposed in the inward side of the U-shaped film F, as illustrated in FIG. 8A, and thereafter the portions of rule lines M6 are folded, as illustrated in FIG. 8B, and the portions separated by the above-described constituting are brought into contact with the lower end section 10d of the positive electrode connection portion (negative electrode connection portion) of the electrode body 10. Next, as illustrated in FIG. 8C, the portions of rule lines M7 and rule lines M8 are folded, and the film F is folded inward so that the side faces of the electrode body 10 are covered by both side edge sections of the film F. The box-shaped insulating holder 30 becomes shaped as a result. Also in a case where the insulating holder 30A is thus shaped, the film F is folded over to a greater extent at the lower end section of the insulating holder 30A than at other portions, and accordingly a deformation portion of appropriate thickness can be formed easily in the lower end section of the inner surface of the insulating holder 30A.

In all the embodiments described above there is used an insulating holder having a flat bottom surface. However, the shape of the insulating holder is not limited to that of the above-described embodiment, so long as the insulating holder has a box shape into which the electrode body can be accommodated. Examples of other shapes of the insulating holder include an insulating holder having a bulging bottom surface. FIG. 9 and FIG. 10A to FIG. 10C illustrate a method for shaping an insulating holder having a bulging bottom surface.

Figure 9:
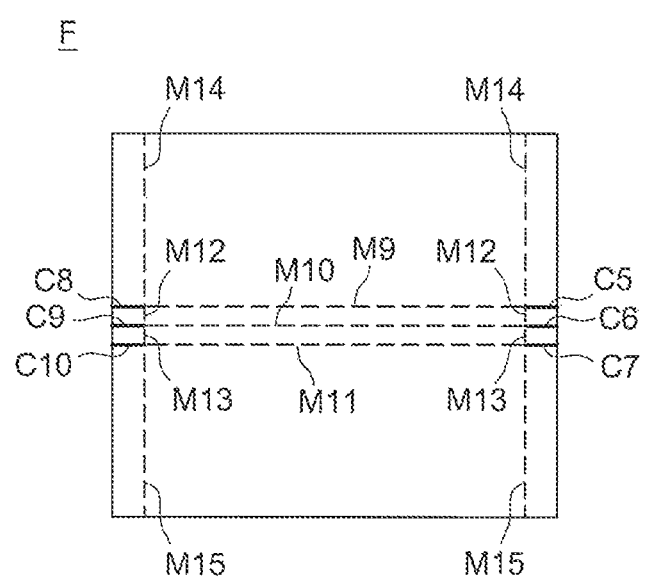
FIG. 9 is a plan-view diagram illustrating a film used for shaping an insulating holder of a sealed battery according to another embodiment of the present disclosure.
Figure 10A:
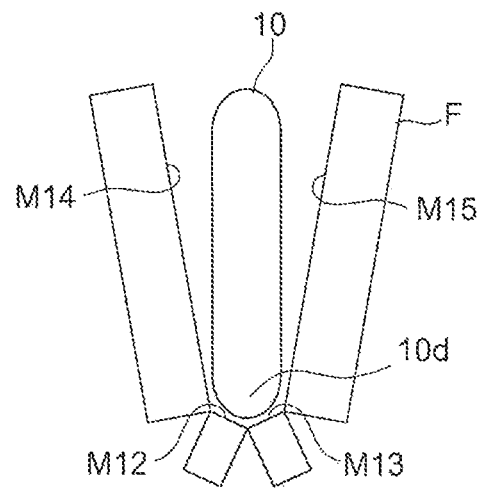
FIG. 10A is a side-view diagram for explaining shaping of an insulating holder of a sealed battery according to another embodiment of the present disclosure.
Figure 10B:
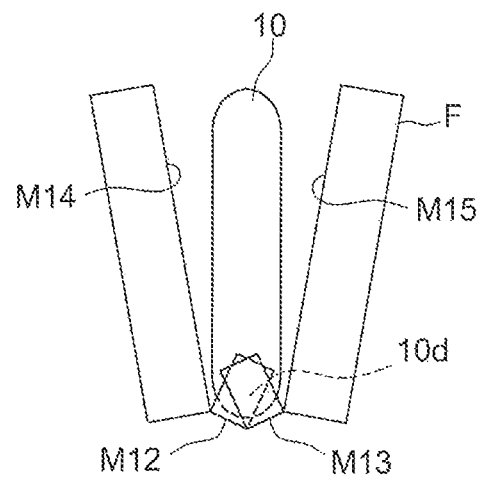
FIG. 10B is a side-view diagram for explaining shaping of an insulating holder of a sealed battery according to another embodiment of the present disclosure.
Figure 10C:
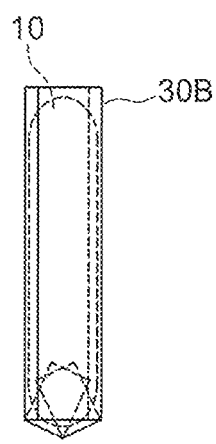
FIG. 10C is a side-view diagram for explaining shaping of an insulating holder of a sealed battery according to another embodiment of the present disclosure.
Figure 11:
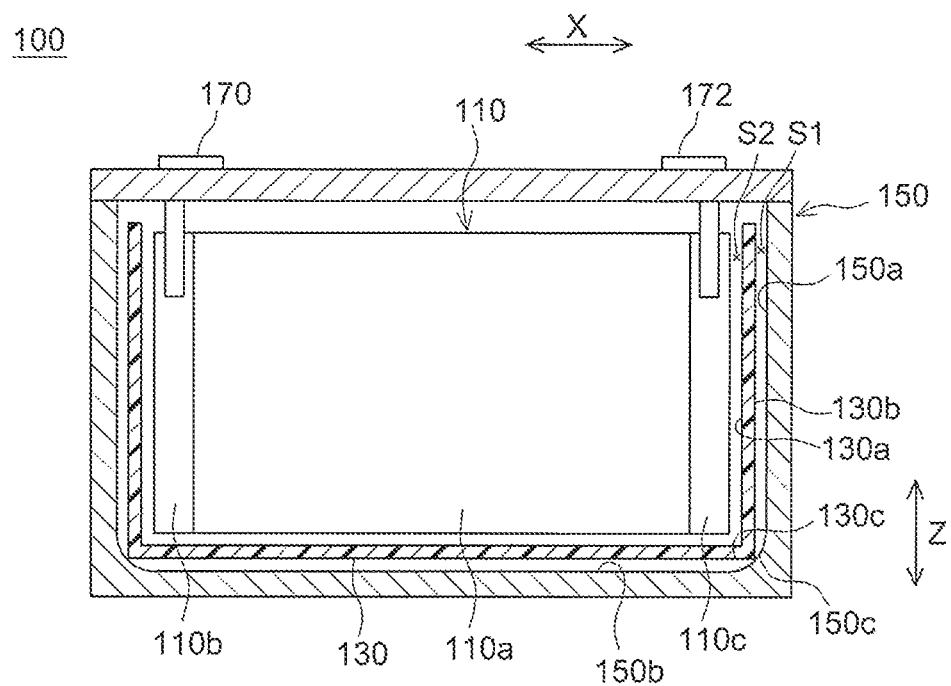
FIG. 11 is a diagram illustrating schematically the internal structure of a conventional sealed battery.

Firstly, the film F illustrated in FIG. 9 is cut along score lines C5 to C10, followed by folding at three sites of rule lines M9 to M11. As a result the film F becomes formed to a U-shape having a bulging bottom surface, as illustrated in FIG. 10A. The electrode body 10 is disposed inward of the film F, after which the film F is folded along the rule lines M12, M13. As a result the film F becomes folded over so that the portions separated through the above-described cuts cover the lower end section 10d of the positive electrode connection portion (negative electrode connection portion) of the electrode body 10, as illustrated in FIG. 10B. The film F is then folded at the portions of rule lines M14 and rule lines M15, so that the side faces of the electrode body 10 are covered by the film F. A box-shaped insulating holder 30B having a bulging bottom surface becomes shaped as a result, as illustrated in FIG. 10C. In this insulating holder 30B the film F is folded over at the inner surface of the lower end section to a greater extent than in the embodiments described above, and accordingly the thickness t (FIG. 4) of the deformation portions 32 can be suitably increased as a result.

In all the embodiments described above an insulating holder having a deformation portion is shaped through folding of a film. However, the method for shaping the insulating holder is not meant to limit the present disclosure in any way, and an insulating holder can be obtained in which a deformation portion is formed on the inner surface of the lower end section of the insulating holder also in the case for instance where a box-shaped insulating holder is formed beforehand by injection molding and an insulating member of a predetermined thickness is then attached to the inner surface of the lower end section of the above insulating holder. However, the deformation portion can be formed more easily by relying on a method that involves folding a film over as in the embodiments described above, as a result of which it becomes possible to suitably suppress drops in production efficiency incurred by forming deformation portions anew.

(2) Formation Position of Deformation Portions

In all the embodiments described above the pair of deformation portions 32 is formed on both sides of the inner surface of the lower end section 30c of the insulating holder 30. However, the deformation portions are not limited to the embodiments described above, and it suffices that a deformation portion be formed in any one of the inner surface of the lower end section of the insulating holder. Short-circuits between the electrode body and the battery case can be suppressed through formation of the deformation portion also in a case where the deformation portion is formed only on one of the inner surfaces of the lower end section of the insulating holder, and accordingly the dimensions of the electrode body can be increased. Also, the deformation portions may be formed on both sides of the inner surface of the lower end section of the insulating holder, as in the embodiments described above, since in that case short-circuits between the battery case and the electrode body can be prevented more reliably.

(3) Structure of Electrode Body

In the embodiments described above a wound electrode body is used as the electrode body. However, the electrode body in the sealed battery disclosed herein need not be a wound electrode body. Other examples of electrode bodies include for instance multilayer electrode bodies resulting from stacking a plurality of positive electrodes and negative electrode across separators. In such multilayer electrode bodies a core portion resulting from laying of a plurality of positive electrode mix layers and negative electrode mix layer opposing each other is formed at a central portion in the width direction. A positive electrode connection portion on which there is laid a plurality of positive electrode collector exposed portions is formed at a first side edge section in the width direction, while a negative electrode connection portion on which there is laid a plurality of negative electrode collector exposed portions is formed at a second side edge section.

Concrete examples of the present disclosure have been explained in detail above, but the examples are merely illustrative in nature, and are not meant to limit the scope of the claims in any way. The features set forth in the claims can accommodate various modifications and alterations of the concrete examples illustrated above.

What is claimed is:

1. A sealed battery, comprising:
an electrode body resulting from winding or stacking of a sheet-shaped positive electrode and a sheet-shaped negative electrode, a flat square-type battery case in which the electrode body and an electrolyte solution are accommodated, and a box-shaped insulating holder that accommodates the electrode body and insulates the electrode body from the battery case,
wherein the positive electrode is provided with a foil-shaped positive electrode collector and a positive electrode mix layer coated onto the surface of the positive electrode collector; the negative electrode is provided with a foil-shaped negative electrode collector and a negative electrode mix layer coated onto surface of the negative electrode collector;

in the electrode body, a core portion at which the positive electrode mix layer and the negative electrode mix layer oppose each other is formed at a central portion in the width direction, and a positive electrode connection portion resulting from winding or stacking of the positive electrode collector not coated with the positive electrode mix layer is formed at a first side edge section in the width direction, and a negative electrode connection portion resulting from winding or stacking of the negative electrode collector not coated with the negative electrode mix layer is formed at a second side edge section in the width direction;

a round section of curved surface is formed between an inner surface and a bottom surface of the battery case, and an inner dimension, in the width direction, of a region at which the round section is formed is smaller than the inner dimension, in the width direction, of a portion of another region of the battery case;

wherein a deformation portion protruding towards the center in the width direction is formed on at least one inner surface of a lower end section of the insulating holder; at least one from among a lower end section of the positive electrode connection portion and a lower end section of the negative electrode connection portion is press-deformed towards the center in the width direction by the deformation portion of the insulating holder, the deformation portion is formed by the process comprising:

folding the film along first rule lines, which are parallel to the width direction of the sealed battery, to form a U-shape in side view;

folding a part of both side edges of the film inward through folding of portions of second rule lines that extend obliquely to the first rule lines so that a respective lower end section of the positive electrode connection portion and the film are in contact with each other; and folding both side edges of the film inward through folding of portions of third rule lines and fourth rule lines that each extend perpendicularly to the first rules lines in such a manner that side faces of the electrode body are covered by the film.

2. The sealed battery according to claim 1, wherein the deformation portion is formed on both sides of the inner surface of the lower end section of the insulating holder.

3. The sealed battery according to claim 1, wherein the insulating holder is formed through folding of a film made of an insulating resin.

4. The sealed battery according to claim 1, wherein a dimension of the electrode body in the width direction is substantially identical to an inner dimension, in the width direction, of an upper end section of the insulating holder.

5. The sealed battery according to claim 4, wherein a dimension difference between the dimension of the electrode body in the width direction and the inner dimension of the upper end section of the insulating holder in the width direction is 0.05 mm or smaller.

6. The sealed battery according to claim 1, wherein the thickness of the deformation portion in the width direction is 0.1 mm to 1.0 mm.

7. The sealed battery according to claim 1, wherein a proportion of the dimension of the core portion in the width direction with respect to the dimension of the electrode body in the width direction is in the range of 0.7 to 0.9.

8. The sealed battery according to claim 1, wherein a height of the deformation portion of the insulating holder is from 5 mm to 20 mm.

9. The sealed battery according to claim 1, wherein a dimension difference between a dimension of the electrode body in the width direction and an inner dimension of an upper end section of the insulating holder in the width direction is 0.05 mm or smaller.

* * * * *